UNITED STATES PATENT OFFICE.

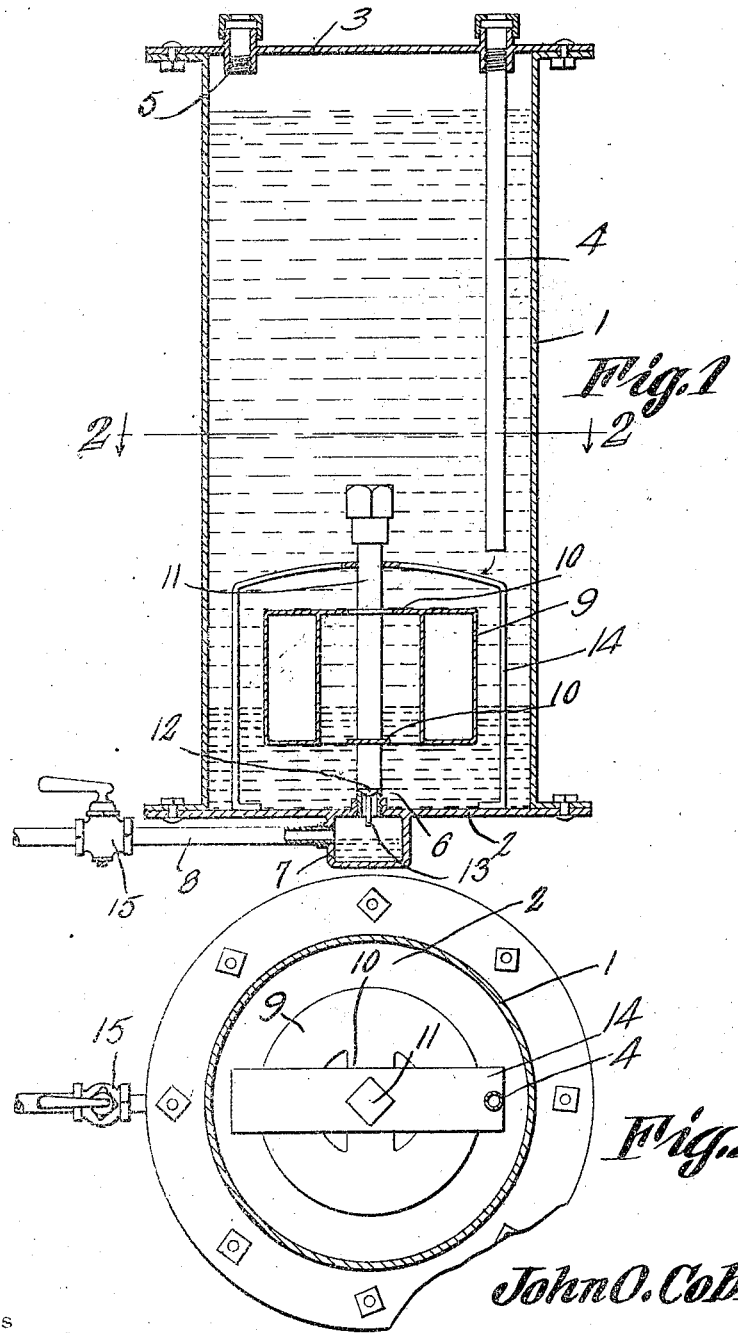

JOHN OLEN COBB, OF WEST, TEXAS.

GASOLENE-SEPARATOR.

1,201,558.  Specification of Letters Patent.  Patented Oct. 17, 1916.

Application filed May 19, 1916. Serial No. 98,654.

*To all whom it may concern:*

Be it known that I, JOHN OLEN COBB, a citizen of the United States, residing at West, in the county of McLennan and State of Texas, have invented a new and useful Gasolene-Separator, of which the following is a specification.

The present invention appertains generally to liquid separators, and aims to provide a novel and improved yet simple and inexpensive device for automatically separating water or other liquid from gasolene or other lighter liquid, the present device being adapted especially for use upon automobiles, although it can be used for many other purposes, for separating water from the gasolene which is delivered to the carbureter.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a vertical median section of the device, portions being shown in elevation. Fig. 2 is a horizontal section taken on the line 2—2 of Fig. 1.

The present separator embodies an upright casing 1, preferably of cylindrical form, and having attached to its lower and upper ends the bottom and top plates 2 and 3, respectively. Attached to and depending from the top plate 3 of the casing 1 is an inflow pipe or tube 4, preferably arranged adjacent one side wall of the casing, and said cover plate 3 has an outlet 5 preferably opposite the inlet tube 4. The inlet tube 4 terminates between the upper and lower ends of the casing 1, to deliver the gasolene and water into the casing at a point sufficiently below the outlet 5 to prevent the possibility of water passing from the inlet to the outlet, even though there is a relatively rapid flow of gasolene through the casing from the inlet to the outlet. Any water entering the casing with the gasolene will settle to the bottom, even with a rapid feeding of the gasolene. The casing 1 can be disposed at any suitable point of the automobile, and the tube 4 is connected to the fuel tank, while the outlet 5 is connected to the carbureter, to thus interpose the casing 1 between the fuel tank and carbureter for separating the water from the gasolene before it reaches the carbureter.

The bottom plate 2 is provided with an upstanding centrally arranged discharge nipple 6, and said bottom plate has a depending discharge chamber 7 below the nipple 6 to which chamber a waste pipe or tube 8 is connected. Said pipe 8 can be extended to any suitable point where it is desired to discharge the water and other waste.

The discharge of water is controlled by a float 9, preferably of annular form, which may be of hollow or other suitable construction. Said float 9 is of such a character, that it is of greater specific gravity than gasolene, but is of lighter specific gravity than water, whereby said float will sink in gasolene, but will be buoyed up by water. The float 9 is provided with cross pieces 10 to which a vertical valve stem 11 is rigidly engaged, and the lower end of said valve stem has a valve 12 seatable upon the nipple 6 by the weight of the float when it is surrounded by gasolene. The valve 12 has a depending guide finger 13 projecting within the nipple 6, to hold the valve 12 in position relative to the nipple when the valve is unseated, to prevent the displacement of the valve. The upper terminal of the stem 11 is guided through the intermediate or yoke portion of an arch 14 secured upon the bottom plate 2 and extending over the float 9.

In operation, when there is but a small amount of water in the lower portion of the casing 1, the float 9 being surrounded by gasolene, will gravitate to hold the valve 12 seated, but when the water level rises sufficiently to lift the float 9, the valve 12 will be unseated, and this will permit the water to flow through the nipple 6 into the waste pipe 8, until the water level is again lowered sufficiently to permit the valve 12 to be seated. The gasolene being delivered into the casing 1 at a point between the upper and lower ends of the casing, will avoid the possibility of water flowing across to the outlet 5, and the water can readily settle to the bottom of the casing. Even though the supply of gasolene in the tank (not shown) is exhausted, there is no possibility of the water being drawn through the outlet 5.

The pipe 8 is provided with a stop cock whereby said pipe can be closed if necessary, as in case of an accident. The pipe 8 is of such diameter to permit of the flow of water therethrough as fast as it enters the casing.

Having thus described the invention, what is claimed as new is:

A separator embodying a casing, a bottom plate attached to the lower end thereof, said casing having an upper outlet for liquid of certain specific gravity and an inlet communicating therewith between the upper and lower portions of the casing, an arch secured upon the bottom plate, an annular float movable vertically within said arch and of a greater specific gravity than said liquid and of less specific gravity than another liquid, the bottom plate having an outlet for the second mentioned liquid and a valve seat, a vertical stem centrally of the float and having a valve at its lower end seatable upon said seat, the upper portion of the stem being slidable through the yoke portion of said arch, and cross pieces carried by the valve engaged with said stem.

In testimony that I claim the foregoing as my own, I have hereto affixed my signature in the presence of two witnesses.

JOHN OLEN COBB.

Witnesses:
A. L. WILIE,
J. H. THOMAS.